(12) United States Patent
    Fetterly

(10) Patent No.: US 12,649,539 B1
(45) Date of Patent: Jun. 9, 2026

(54) QUADRUPEDAL TRICYCLE

(71) Applicant: Richard Fetterly, Faribault, MN (US)

(72) Inventor: Richard Fetterly, Faribault, MN (US)

( * ) Notice: Subject to any disclaimer, the term of this patent is extended or adjusted under 35 U.S.C. 154(b) by 0 days.

(21) Appl. No.: 19/382,442

(22) Filed: Nov. 7, 2025

Related U.S. Application Data

(60) Provisional application No. 63/724,977, filed on Nov. 26, 2024.

(51) Int. Cl.
    *B62K 5/05* (2013.01)
    *B62K 5/06* (2006.01)
    *B62K 23/02* (2006.01)
    *B62K 23/08* (2006.01)

(52) U.S. Cl.
    CPC .................. *B62K 5/05* (2013.01); *B62K 5/06* (2013.01); *B62K 23/02* (2013.01); *B62K 23/08* (2013.01)

(58) Field of Classification Search
    CPC ............ B62K 5/05; B62K 5/06; B62K 23/02; B62K 23/08; B62M 1/12
    See application file for complete search history.

(56) References Cited

U.S. PATENT DOCUMENTS

| | | | | | |
|---|---|---|---|---|---|
| 582,315 | A | * | 5/1897 | Quinn | B62M 1/12 |
| | | | | | 280/250 |
| 632,797 | A | * | 9/1899 | Van Horn | B62M 1/12 |
| | | | | | 280/250 |
| 2,390,719 | A | * | 12/1945 | Kurth | B62K 5/02 |
| | | | | | D12/112 |
| 3,193,305 | A | * | 7/1965 | Hendricks | B62M 1/14 |
| | | | | | 280/250 |
| 3,485,508 | A | * | 12/1969 | Hudnall | B62K 15/00 |
| | | | | | 280/250 |
| 3,823,959 | A | * | 7/1974 | Winters | B62M 1/12 |
| | | | | | 280/250 |
| 3,910,599 | A | * | 10/1975 | Thomas | B62K 3/005 |
| | | | | | 280/236 |
| 4,152,005 | A | * | 5/1979 | Vanore | B62M 1/12 |
| | | | | | 280/282 |
| 4,303,255 | A | * | 12/1981 | Thomas | B62K 3/005 |
| | | | | | 280/250 |
| 5,082,302 | A | * | 1/1992 | Nacar | B62M 1/12 |
| | | | | | 280/250 |
| 6,264,224 | B1 | * | 7/2001 | Phillips | B62M 23/00 |
| | | | | | 280/250 |

(Continued)

FOREIGN PATENT DOCUMENTS

KR      200462239 Y1     9/2012

OTHER PUBLICATIONS

Berkel Bike, "Berkel Bike Pro" <<https://berkelbike.com/product/berkelbike-pro/>> (accessed Oct. 8, 2024).
Berkel Bike, "BerkelBike Pro leaflet," download at <<https://berkelbike.com/product/berkelbike-pro/>> (accessed Oct. 8, 2024).

(Continued)

*Primary Examiner* — Valentin Neacsu
*Assistant Examiner* — Michael R Stabley
(74) *Attorney, Agent, or Firm* — Mai D. Lauer; Westman, Champlin & Koehler, P.A.

(57) ABSTRACT

An exemplary apparatus includes first and second foot pedals attached to a first sprocket; first and second hand grips attached to a second sprocket; a first chain connecting the first and second sprockets; and a second chain connecting the first sprocket to a third sprocket.

19 Claims, 14 Drawing Sheets

(56)  References Cited

U.S. PATENT DOCUMENTS

| | | | | |
|---|---|---|---|---|
| 7,077,415 | B2 * | 7/2006 | Ikeda | B62M 1/16 |
| | | | | 280/282 |
| 7,293,623 | B2 | 11/2007 | Berkelmans | |
| 8,292,315 | B1 * | 10/2012 | Pelkonen | B62K 5/06 |
| | | | | 280/288.1 |
| 8,403,349 | B2 * | 3/2013 | Pi | B62M 1/12 |
| | | | | 280/234 |
| 8,955,862 | B1 | 2/2015 | Narrow | |
| 10,029,755 | B2 | 7/2018 | Rasmussen | |
| 10,112,679 | B2 * | 10/2018 | Ristanovic | B62M 1/12 |
| 10,710,664 | B2 | 7/2020 | Cao | |
| 11,299,235 | B2 * | 4/2022 | Durrani | B62M 3/00 |
| 11,702,170 | B2 * | 7/2023 | Zeng | B62M 1/28 |
| | | | | 280/220 |
| 2017/0050696 | A1 * | 2/2017 | Beresnitzky | B62K 25/04 |

OTHER PUBLICATIONS

Ebay Inc., "Mobo Shift 20" 3 wheels Crusier Recumbent Trike with Reverse Blue," <<https://www.ebay.com/itm/28425982089var=0&mkevt=1&mkcid=1&mkrid=711-53200-19255-0&campid=5338590836&toolid=10044&customid=1e02 . . .>> (accessed Oct. 8, 2024).

Mobocruiser, "Buy Mobo Triton Pro Adult Tricycle—Recumbent Adult Trike," <<https://www.mobocruiser.com/products/mobo-triton-pro?srsltid=AfmBOorkWSa7CTQhgAHuxHpralywPEx0FnrWPSwi8Sjv_PJAylsyRsW3>> (accessed Oct. 8, 2024).

Walmart.com, "Electric Recumbent Tricycle for Adults | Recumbent E Trike with Folding Design," <<https://walmart.com/ip/Electric-Recumbent-Tricycle-for-Adults-Recumbent-E-Trike-with-Folding-Design/5400308116?wmlspartner=wlpa&selected . . .>> (accessed Oct. 8, 2024).

* cited by examiner

QUADRUPEDAL TRICYCLE

CROSS REFERENCE TO RELATED APPLICATIONS

This application claims the benefit of priority of U.S. Provisional Patent Application No. 63/724,977 for "Quadrupedal Tricycle," filed on Nov. 26, 2024, which is incorporated by reference in its entirety.

BACKGROUND

Cycling devices such as unicycles, bicycles, tricycles, and other less common pedaled vehicles offer not only transportation but also exercise for the user. They are beneficial as a reliable mode of transit that does not require the expense or inconveniences of fueling with electricity, gas, or another form of stored energy. Rather, the reliance on a human's physical power output is sufficient.

Bicycles are the most common form of human powered cycle, though they are not ideal for users who have balance issues or just prefer a more stable ride. While a tricycle having three wheels is more stable, it is also generally a more bulky and heavier vehicle, thereby requiring increased physical effort from the rider. Most tricycles, and cycle apparatuses in general, make use of the leg power of a rider to spin its wheels, which are attached by chains and sprockets to a pair of foot pedals. The disclosed tricycle offers further advantages by using the full body power output of the rider, thereby not being limited to leg muscle output for the transmission of motive power.

SUMMARY

An exemplary apparatus comprises first and second foot pedals attached to a first sprocket; first and second hand grips attached to a second sprocket; a first chain connecting the first and second sprockets; and a second chain connecting the first sprocket to a third sprocket.

This summary and the Abstract are provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps and do not supply a serial or numerical limitation on the elements or steps of the embodiments thereof. For example, "first," "second," and "third" elements or steps need not necessarily appear in that order, and the embodiments thereof need not necessarily be limited to three elements or steps. Unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. The singular forms of "a," "an," and "the" include plural references unless the context clearly dictates otherwise.

DETAILED DESCRIPTION

Figure 1:
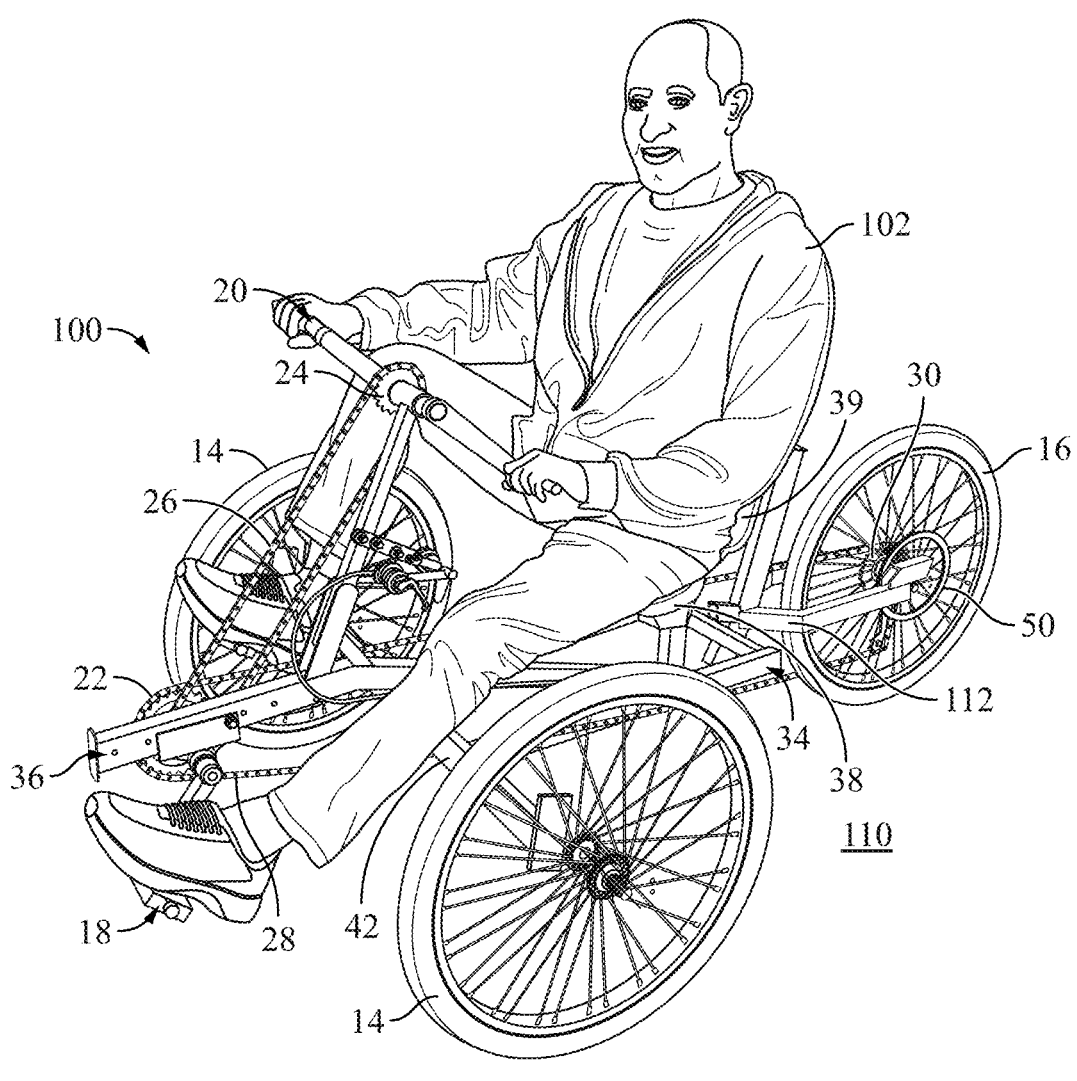
FIG. 1 is a left view of an exemplary tricycle with a rider.

FIG. 1 is a left perspective view of an exemplary quadrupedal tricycle 100, illustrated with a rider 102 thereon. The vehicle is a tricycle with two front wheels 14 and a single rear wheel 16. The term quadrupedal refers to the two foot pedals 18 and two hand grips (pedals) 20. The disclosed tricycle uses the arms as well as the legs of the rider for transmission of motive power. A challenge when using both arms and legs is that there also needs to be a method for steering. The disclosed tricycle overcomes that problem by tilting the hand crank stem left or right to turn the front wheels as described below.

Figure 2:
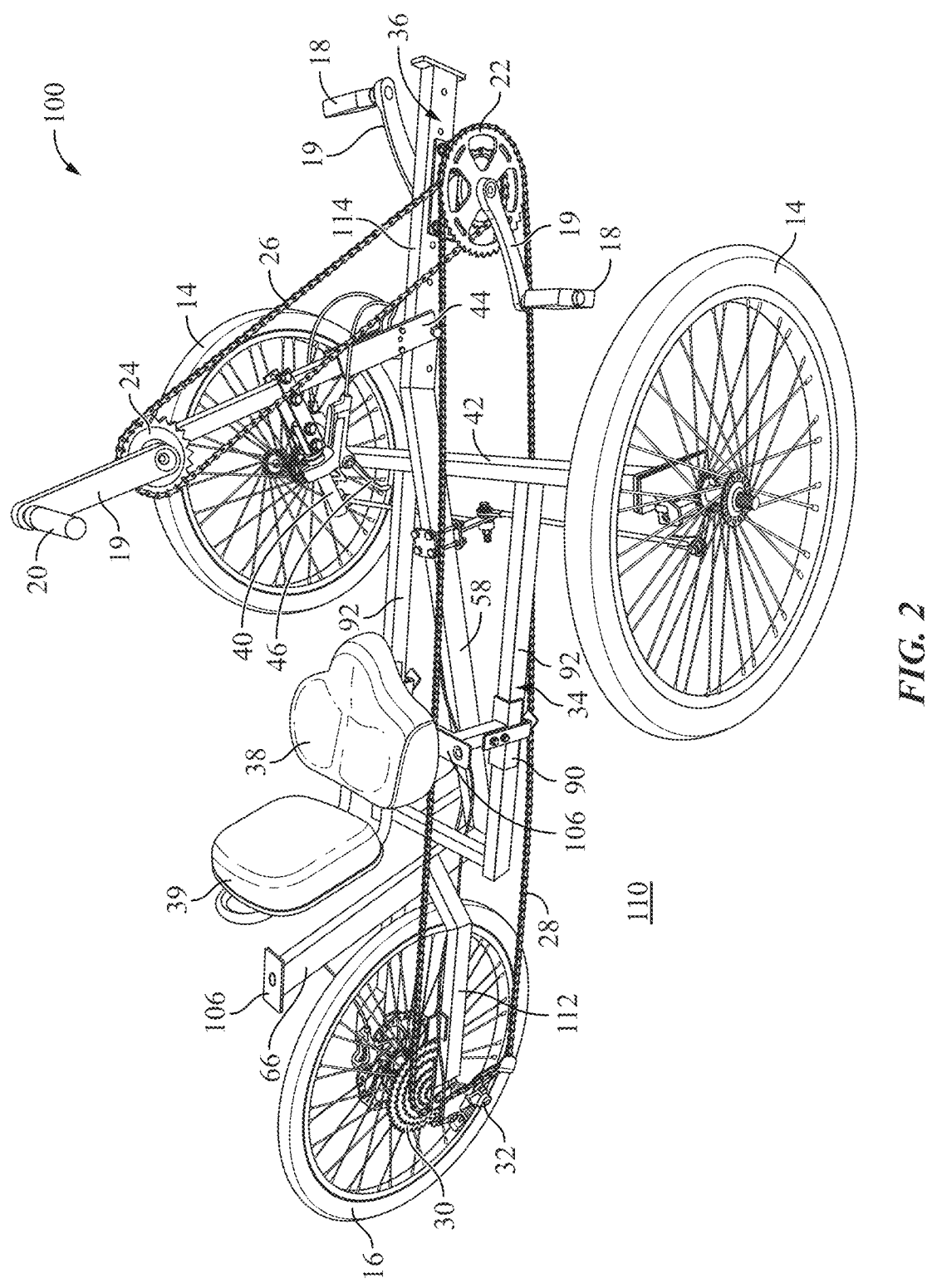
FIG. 2 is a right perspective view of the tricycle without a rider.

As shown more clearly in FIG. 2, the foot pedals 18 are connected via crank arms 19 to a front sprocket 22; similarly, the hand grips or grips 20 are connected via crank arms 19 to an upper sprocket 24. A suitable crank set is commercially available from Shimano Inc. of Osaka, Japan under model no. FC-M315-B2. Suitable pedals 18, 20 are commercially available under the Hawthorne brand under model name Sunlite Hawthorn Platform Pedals, model no. 410059. For a more comfortable hand grip, the outer portions of the pedals can be cut off so that the central stem is gripped by the user's hands. The front sprocket 22 and upper sprocket 24 are connected by a chain 26 that ties the two sprockets 22, 24 so that they rotate at the same speed.

In an exemplary embodiment, the upper chain 26 is fixed to the upper sprocket 24 and a chain ring of front sprocket 22. The primary or lower chain 28 is connected to a different chain ring of the front sprocket 22 and also to the rear cog set 30 by a rear derailleur 32. A suitable rear cog set 30 is commercially available from Microshift company of Taiwan under model name Advent X. A suitable derailleur is commercially available from Shimano Inc. of Osaka, Japan under model no. RD-M5120. A user moves gear shift lever 70 to actuate derailleur 32 to move lower chain 28 among the different chain rings of cogset 30, thereby changing gears of the lower chain 28. A suitable shifter is commercially available from Shimano Inc. of Osaka, Japan under model no. SL-M6000. In an exemplary embodiment, the rear cog set 30 includes a conventional coasting clutch to allow for coasting when the foot and hand grips do not turn their respective crank arms.

Figure 6:
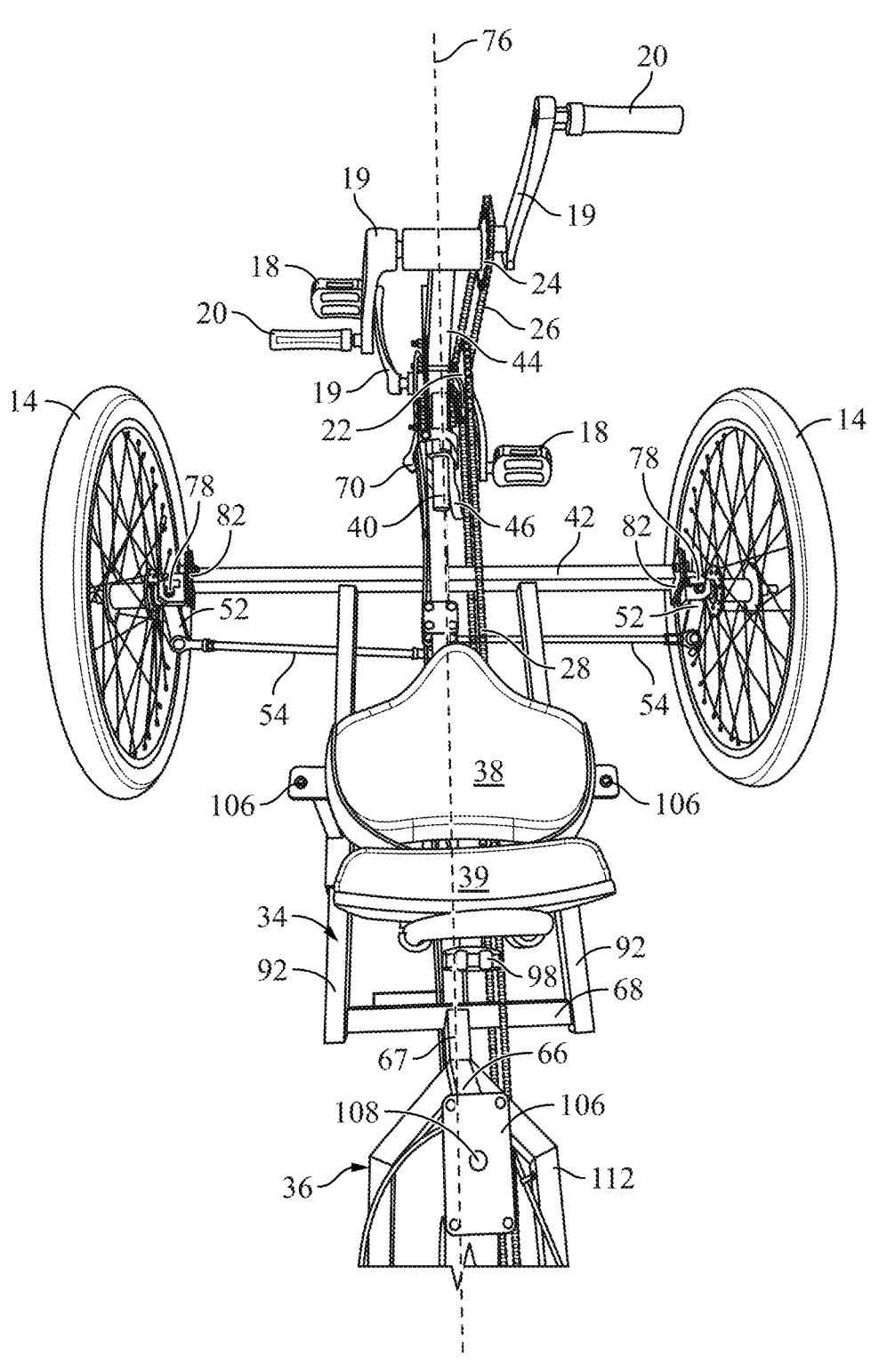
FIG. 6 is a partial top view of the tricycle in a straight steering configuration, as viewed from the rear.

In an exemplary embodiment as shown in FIG. 6, the brake lever 46 and gear shift lever 70 are both positioned on the tilting frame 36 forward of the driver's seat 38. In an exemplary method of use, each of the levers 46, 70 would be operated with one hand while coasting; the other hand would continue to steer by applying pressure on a hand grip 20 and thus maintaining a desired orientation of the hand crank stem 44.

In the exemplary tricycle 100, power from both hand grips 20 and both foot pedals 18 is transmitted through the upper chain 26 and lower chain 28 to provide rotation of the rear wheel 16. The front wheels 14 are not powered but provide stability and steering capabilities. Because the human effort is used to turn the hand crank of the hand grips 20 and also turn the more conventional foot pedals 18, the entire body is used to propel the quadrupedal tricycle 100. This leads to more efficient use of the human power output and also provides a means by which the arms and legs are simultaneously exercised.

In an exemplary embodiment, the tricycle 100 includes a fixed frame 34 and a tilting frame 36. In an exemplary embodiment, seat 38, front axle 42 and front wheels 14 are part of the fixed frame 34. In an exemplary embodiment, the hand crank stem 44, upper sprocket 24, front sprocket 22, hand grips 20, foot pedals 18, both chains 26, 28 and rear wheel 16 are attached to the tilting frame 36. The tilting frame 36 includes a horizontal member 114, inclined member 58, post 66 with stop 67, and split rear frame 112. In an exemplary embodiment, the brake assembly includes tube 40, around which the user wraps a right hand for squeezing brake handle 46 upward. Brake handle 46 is attached by a cable to rear disc brake 50, which is engaged when a user pulls on the brake handle 46 to pivot it upward in brake direction 48, toward tube 40. A suitable brake disc is commercially available from SRAM of Chicago, Illinois as a Centerline Rounded Rotor of 200 mm diameter.

Figure 5:
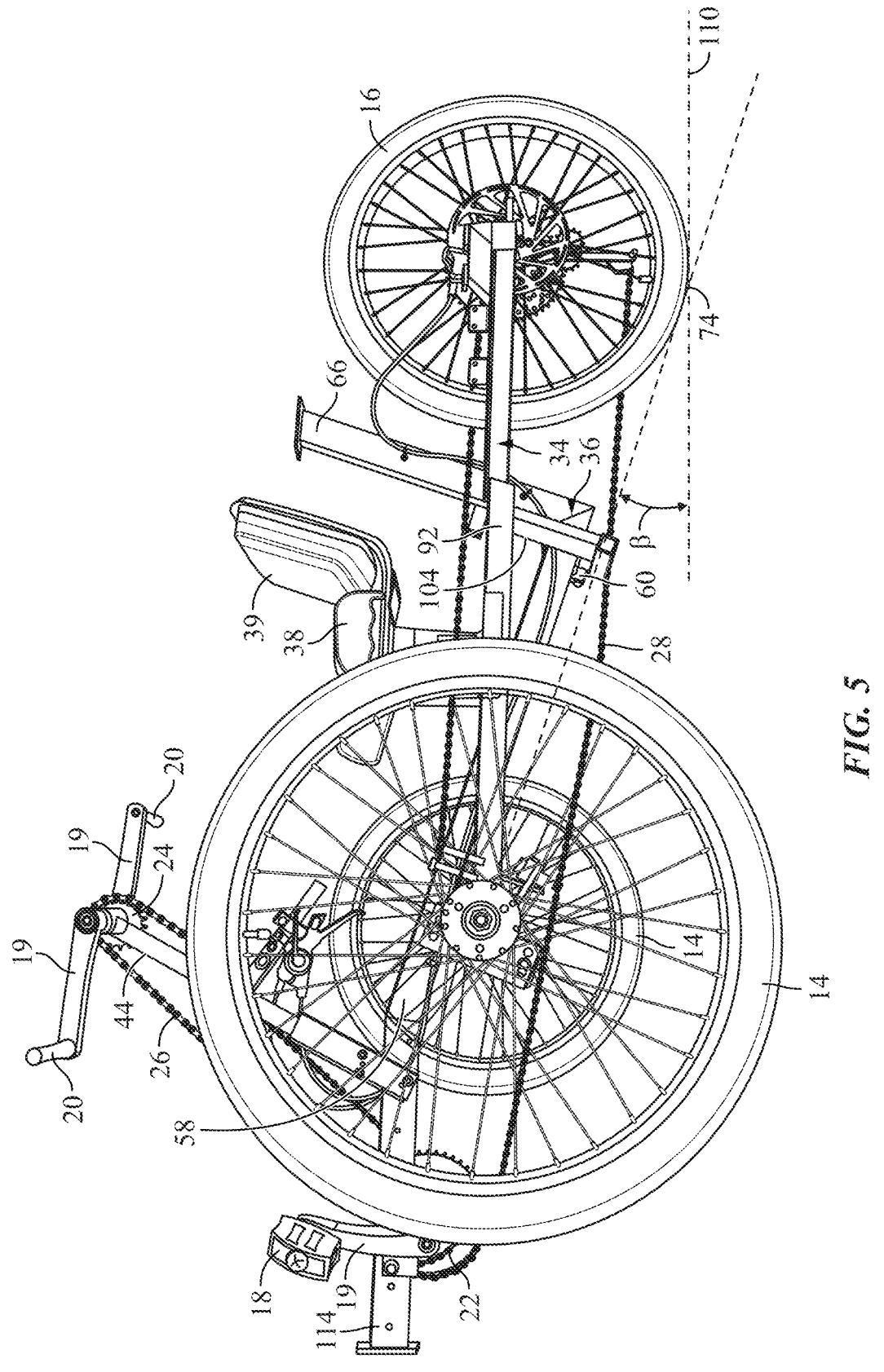
FIG. 5 is a left side view of the tricycle.

Referring to FIGS. 6-12, in an exemplary embodiment, the fixed frame 34 and tilting frame 36 are connected by pivoting linkages 52, tie rods 54, pitman arm 56, and hinges 60. As seen most easily in FIG. 5, tilting frame 36 includes an inclined frame member 58 that is oriented parallel to a straight line between 1) a lower pivot point at bearings 64 between pitman arm 56 and tie rods 54; and 2) a contact patch 74 at which the rear wheel 16 contacts the ground surface. We note that the inclined frame member 58 does not extend all the way to the rear wheel 16, but this inclination orientation is important for smooth tilting of the tilting frame 36 relative to the fixed or stationary frame 34. In an exemplary embodiment, angle beta is between about 10 degrees and about 25 degrees. In the illustrated embodiment, angle beta is about 17 degrees.

While we refer to a fixed frame 34, it is to be understood that this designation is for distinguishing between it and the tilting frame 36, which tilts with respect to the fixed frame 34. Of course, because the tricycle 100 is a mobile apparatus, none of its components is fixed in an absolute position relative to ground surface 110 during use.

Figure 3:
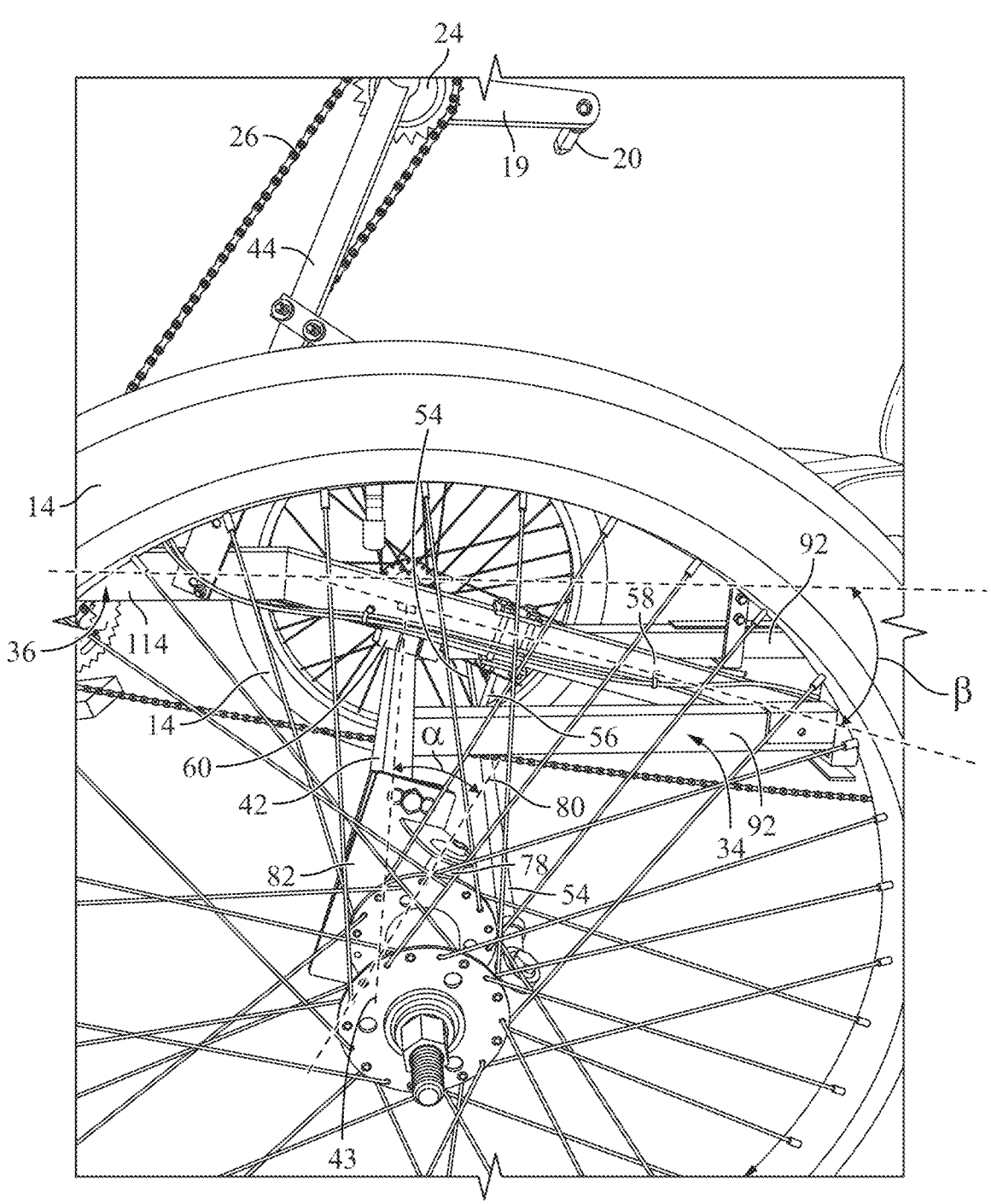
FIG. 3 is an enlarged left perspective view of a portion of the exemplary tricycle showing a hinge between the fixed frame and the tilting frame.
Figure 8:
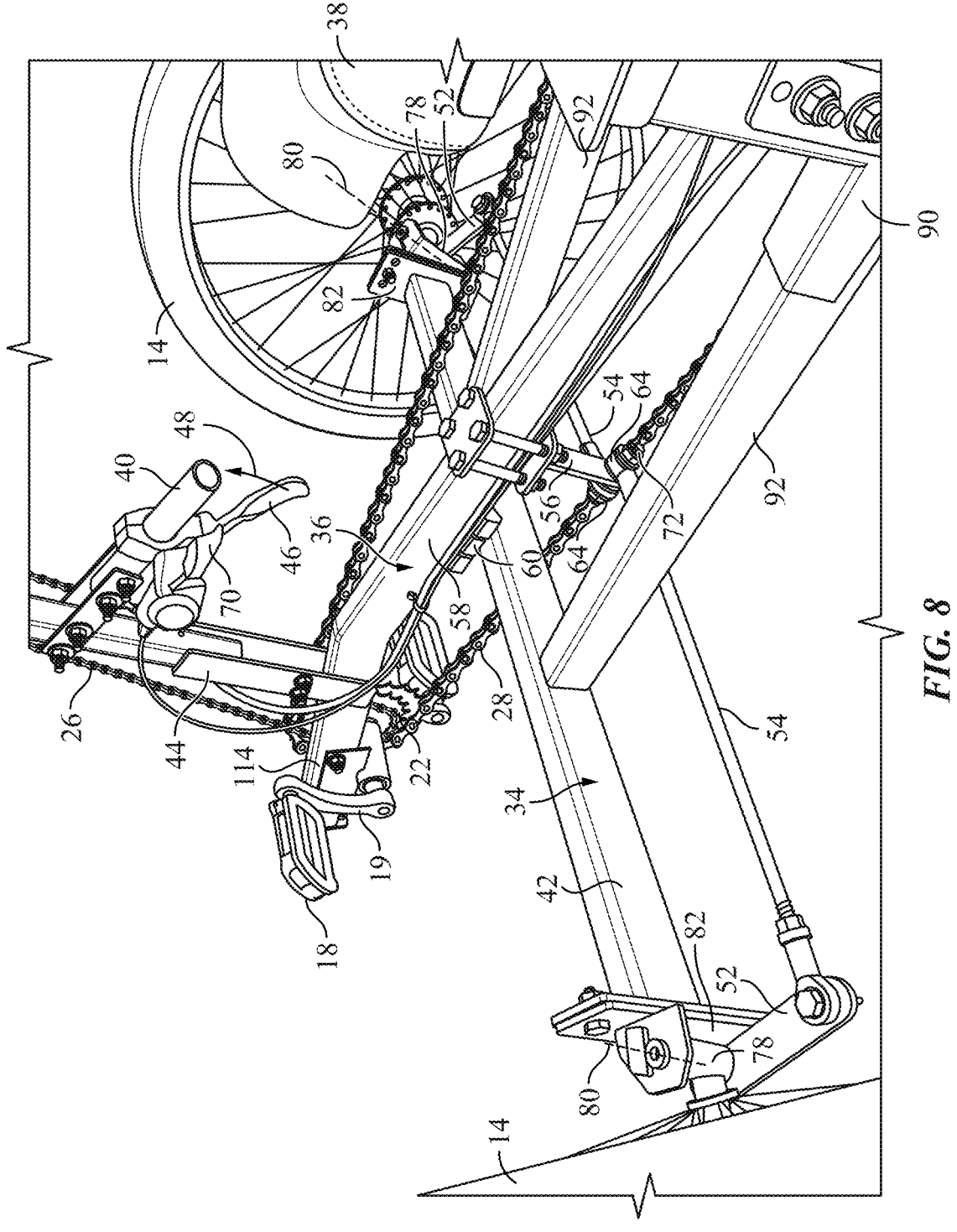
FIG. 8 is a rear left partial view of the tricycle in a straight steering configuration.
Figure 9:
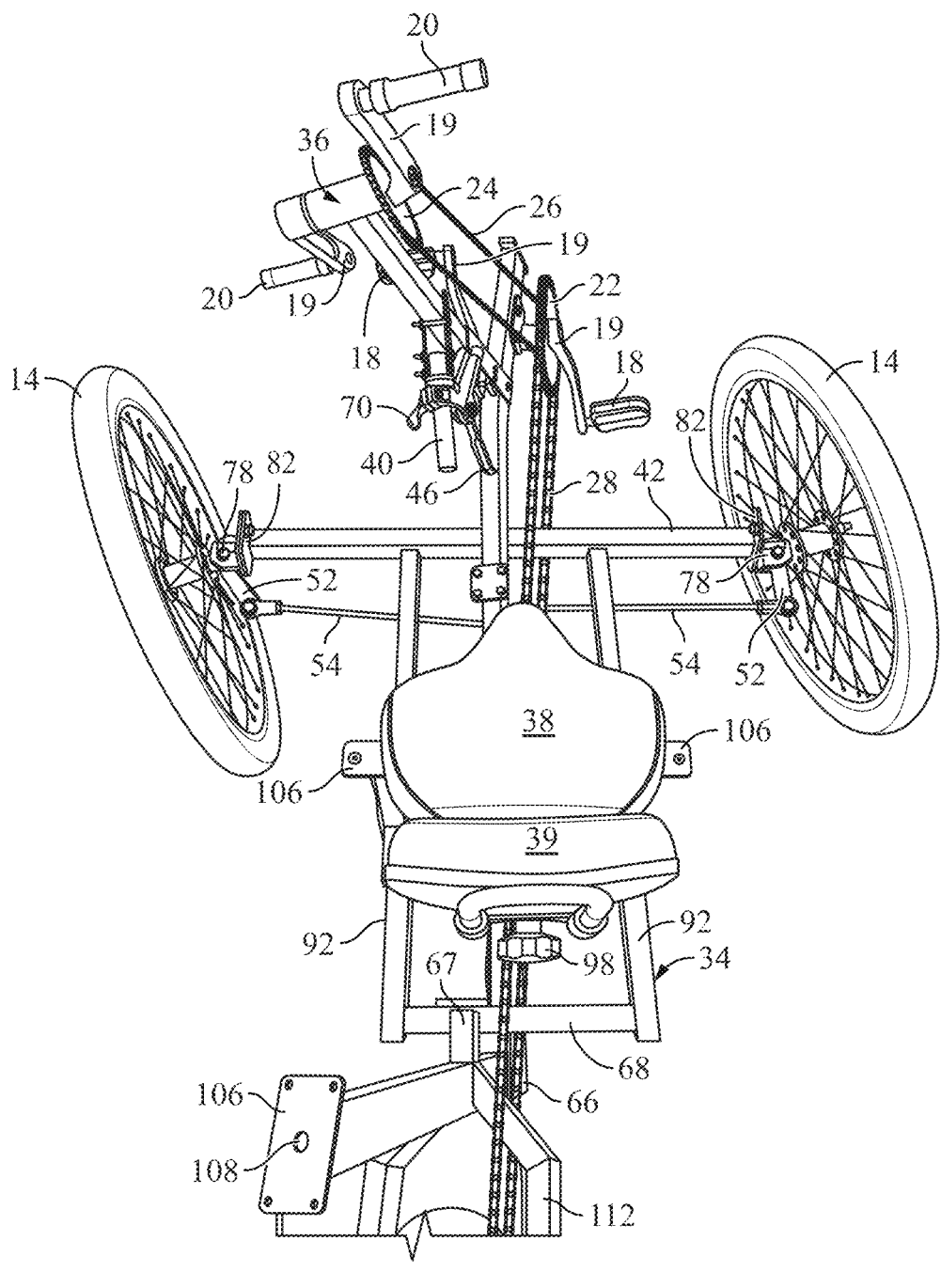
FIG. 9 is a partial top view of the tricycle in a left turning configuration, as viewed from the rear.
Figure 11:
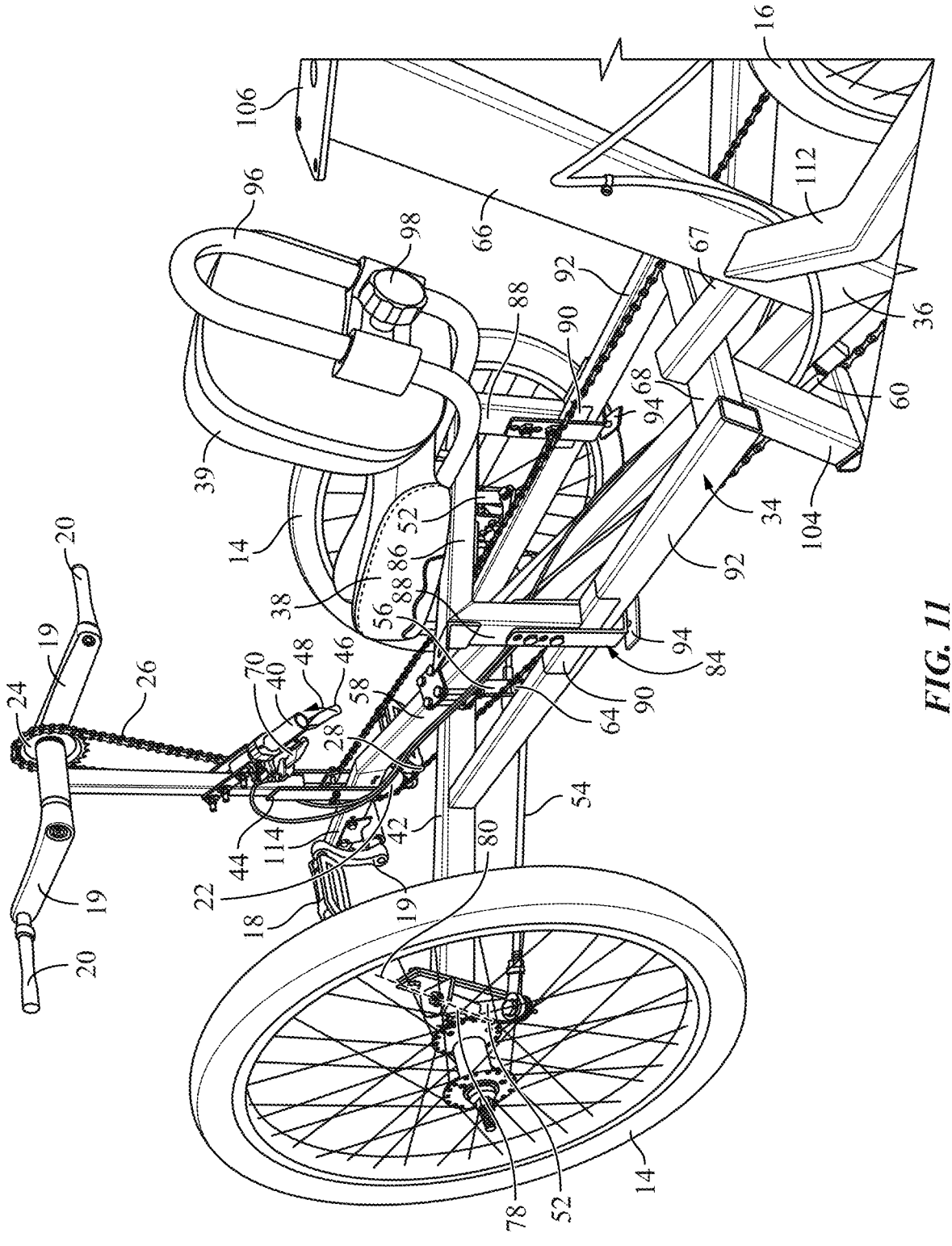
FIG. 11 is a partial rear left perspective view of the tricycle in a left turning configuration.
Figure 12:
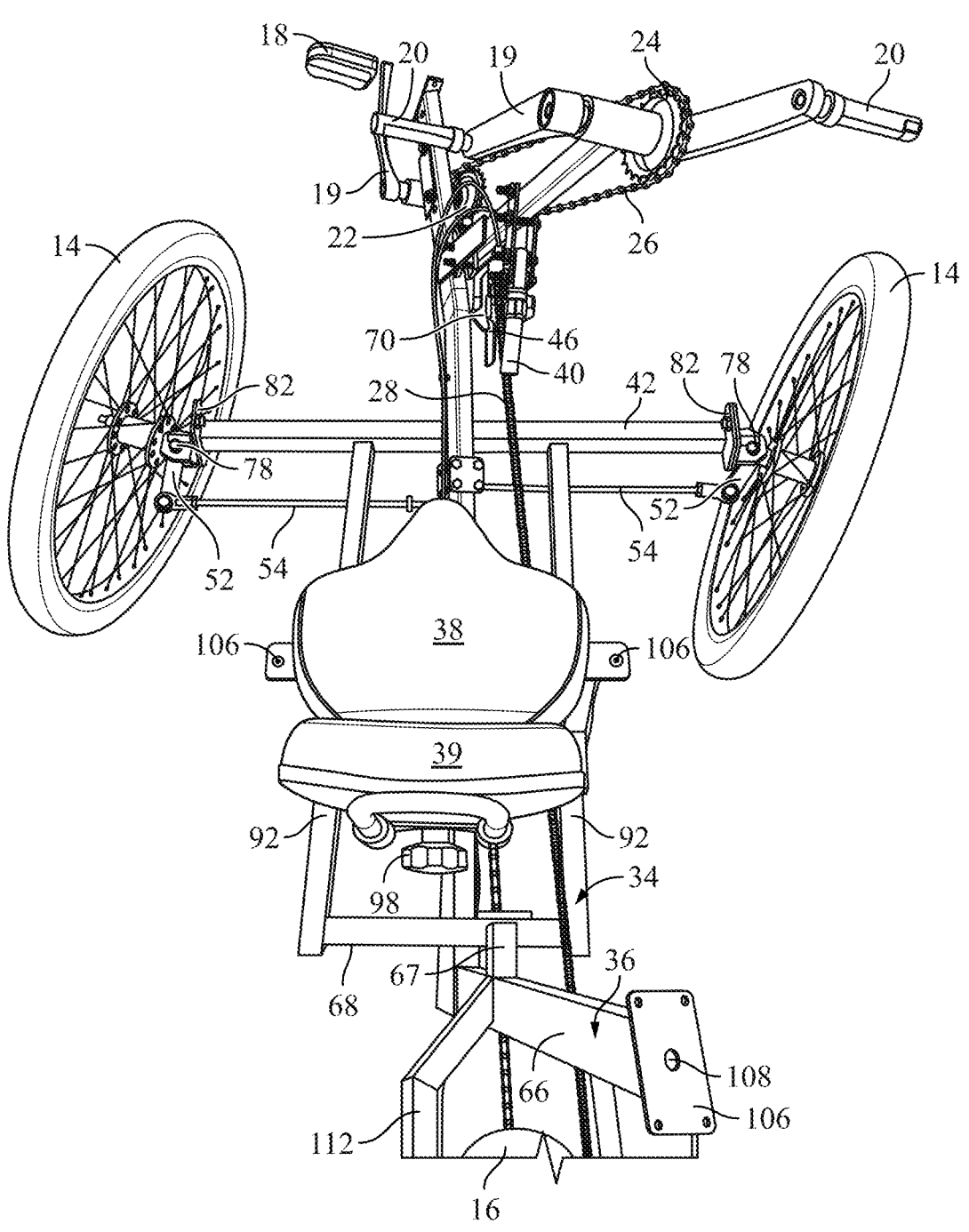
FIG. 12 is a partial top view of the tricycle in a right turning configuration, as viewed from the rear.
Figure 14:
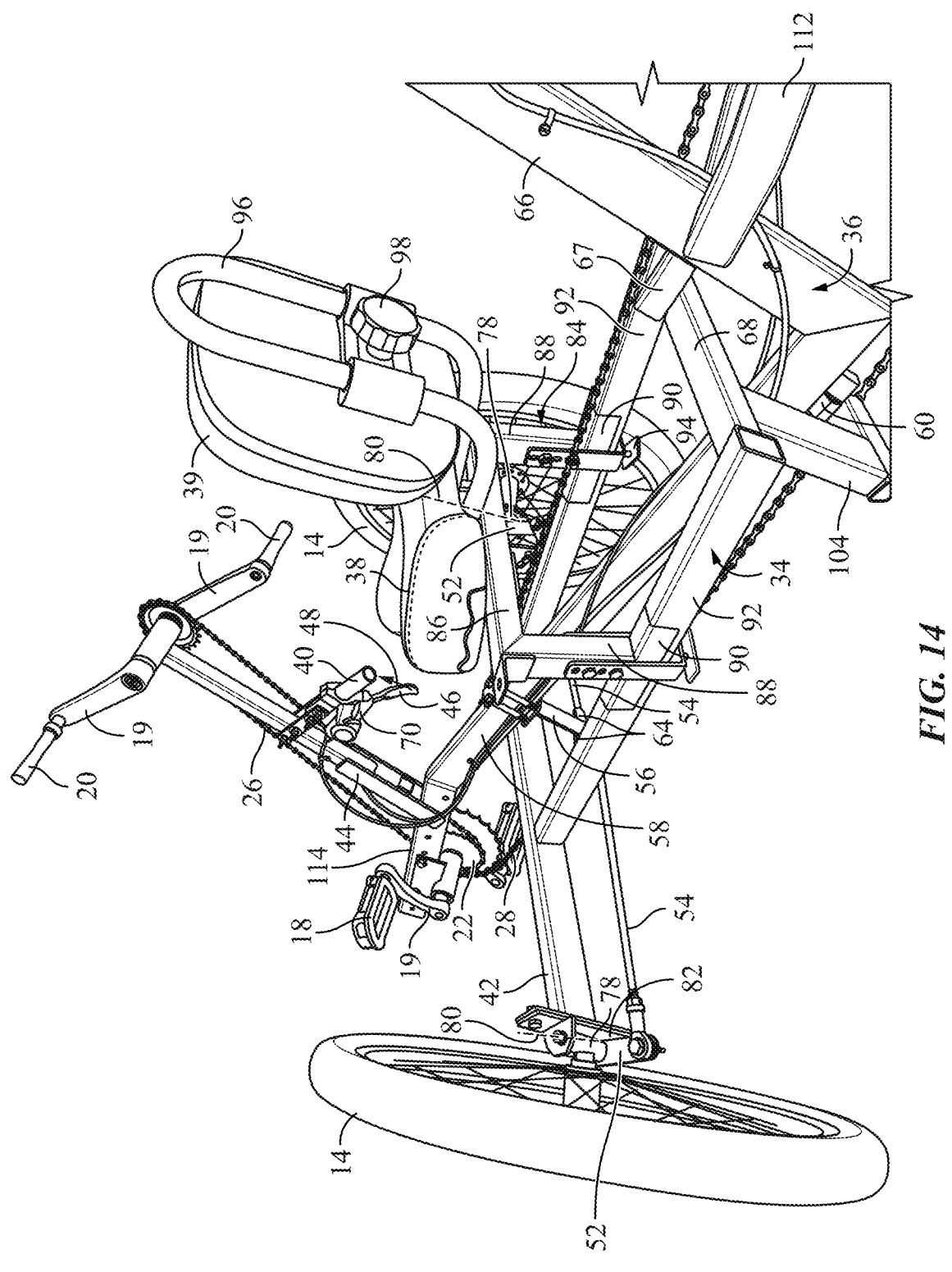
FIG. 14 is a partial rear view of the tricycle in a right turning configuration.

As shown in FIG. 3, pitman arm 56 extends at a right angle to the inclined frame member 58. FIGS. 8, 11 and 14 show perspective views of the pitman arm 56 in straight, left turning, and right turning configurations, respectively. Top views of the tricycle 100 in FIGS. 6, 9 and 12 show the same straight, left turning, and right turning configurations, respectively. As the tilting frame 36 leans to the left to cause a left turn, a top end of the pitman arm 56 is pivotally attached to the inclined frame member 58, while a lower portion of pitman arm 56 is pivotally attached to inner ends of tie rods 54 via spherical rod end bearings 64. Outer ends of the tie rods 54 are attached to pivot linkages 52, which are attached to turn with spindles 78 about axis 80. Each spindle 78 is attached to a front wheel 14; each spindle is also attached by bracket 82 to axle 42.

Figure 7:
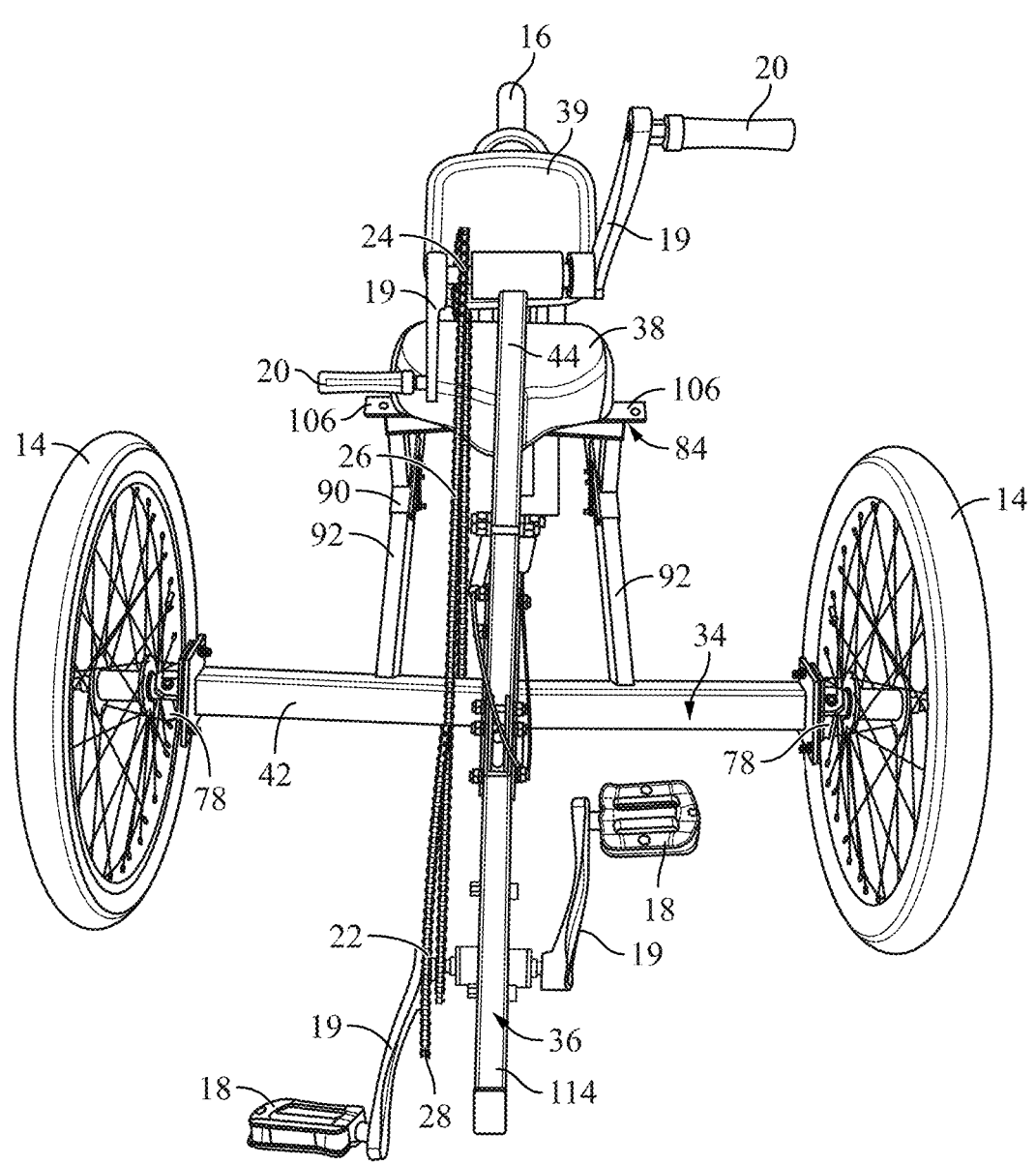
FIG. 7 is a front view of the tricycle in a straight steering configuration.

FIGS. 6, 7 and 8 show the tricycle 100 in a straight traveling configuration. Both pivot linkages 52 extend from the axle 42 at an angle toward a longitudinal center line 76 of the tricycle 100 to pivotally connect to the tie rods 54.

Figure 10:
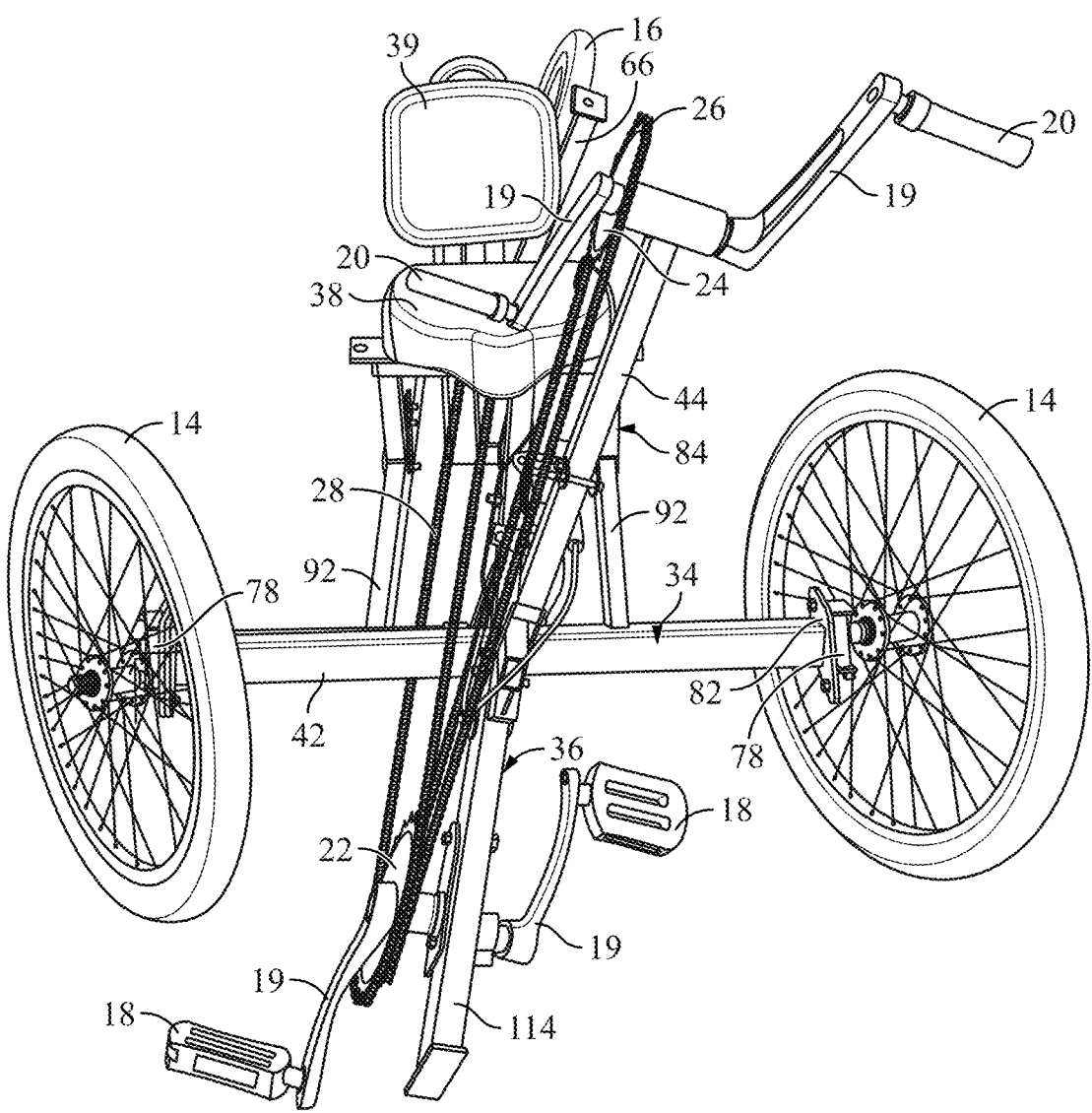
FIG. 10 is a front view of the tricycle in a left turning configuration.

FIGS. 9-11 show a left turning configuration, wherein the user pulls the hand crank stem 44 towards the left, by exerting pressure on the hand grips 20, to cause a lean of the tilting frame 36 to the left. As shown in FIG. 11, this results in a pivoting of the tilting frame 36 about the fixed frame 34 at hinges 60. The top end of pitman arm 56 is attached to the inclined frame member 58, while a bottom portion of the pitman arm tilts to the right, carrying with it the connected inner ends of the rigid tie rods 54. Outer ends of the tie rods 54 in turn pull on pivoting linkages 52. In an exemplary embodiment, each pivoting linkage 52 is attached to a respective front wheel 14 at pivot spindle 78.

As shown in FIG. 3, in an exemplary embodiment, front axle 42 has a substantially vertical dimension that is oriented at a right angle to the inclined frame member 58. The substantially vertical axis 43 of axle 42 is substantially parallel to the pitman arm 56. We refer to axis 43 as being "substantially vertical" because it is oriented at an acute angle Beta with respect to a true vertical that is perpendicular to the ground surface 110. In an exemplary embodiment, each of the spindles 78 for the left and right front wheels 14 is oriented at a spindle axle 80 that is oriented at an acute angle Alpha relative to the substantially vertical axis 43. In an exemplary embodiment, the angle Alpha is between about 20 radial degrees and about 40 radial degrees. In exemplary embodiment, angle Alpha is about 30 degrees. In an exemplary embodiment, linkage 52 is welded to spindle 78 so that they pivot together about the spindle axis 80. A bearing shaft inside the spindle 78 allows it to rotate about the spindle axis 80 even though the mounting bracket 82 of spindle 78 is immovably fixed to axle 42. The orientation of the spindle 78 relative to the front axle 42 at the acute angle Alpha smooths the tilting motion of the tilting frame 36 relative to the fixed frame 34 by preventing binding and "jumping" of components during motion. In an example in which Alpha is about 30 degrees and Beta is about 17 degrees, then the spindle axis 80 is inclined at about 47 degrees from a true vertical.

Pivoting of each linkage 52 results in correlated turning of the front wheel 14. In an exemplary embodiment, the end of each pivot linkage 52 that is attached to tie rod 54 does not extend laterally outside of the end that is attached to axle 42 in any configuration to prevent binding of the turning mechanism. Referring to FIG. 3, the inclination of pitman arm 56 at a right angle to inclined frame member 58 prevents binding of the tilting frame 36 as it tilts left and right in order to effectuate steering of the tricycle 100.

Figure 4:
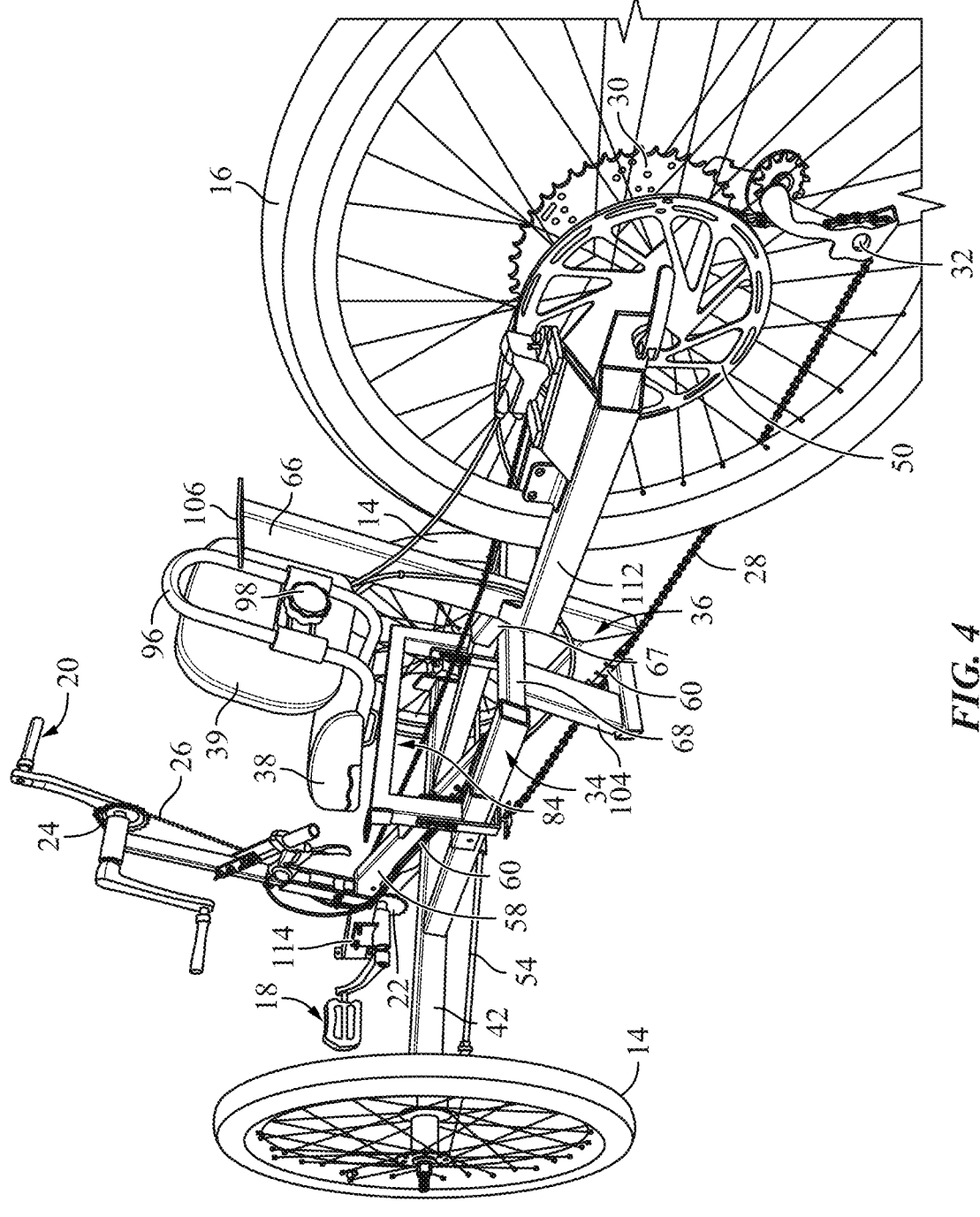
FIG. 4 is a perspective view from a left rear viewing angle.
Figure 13:
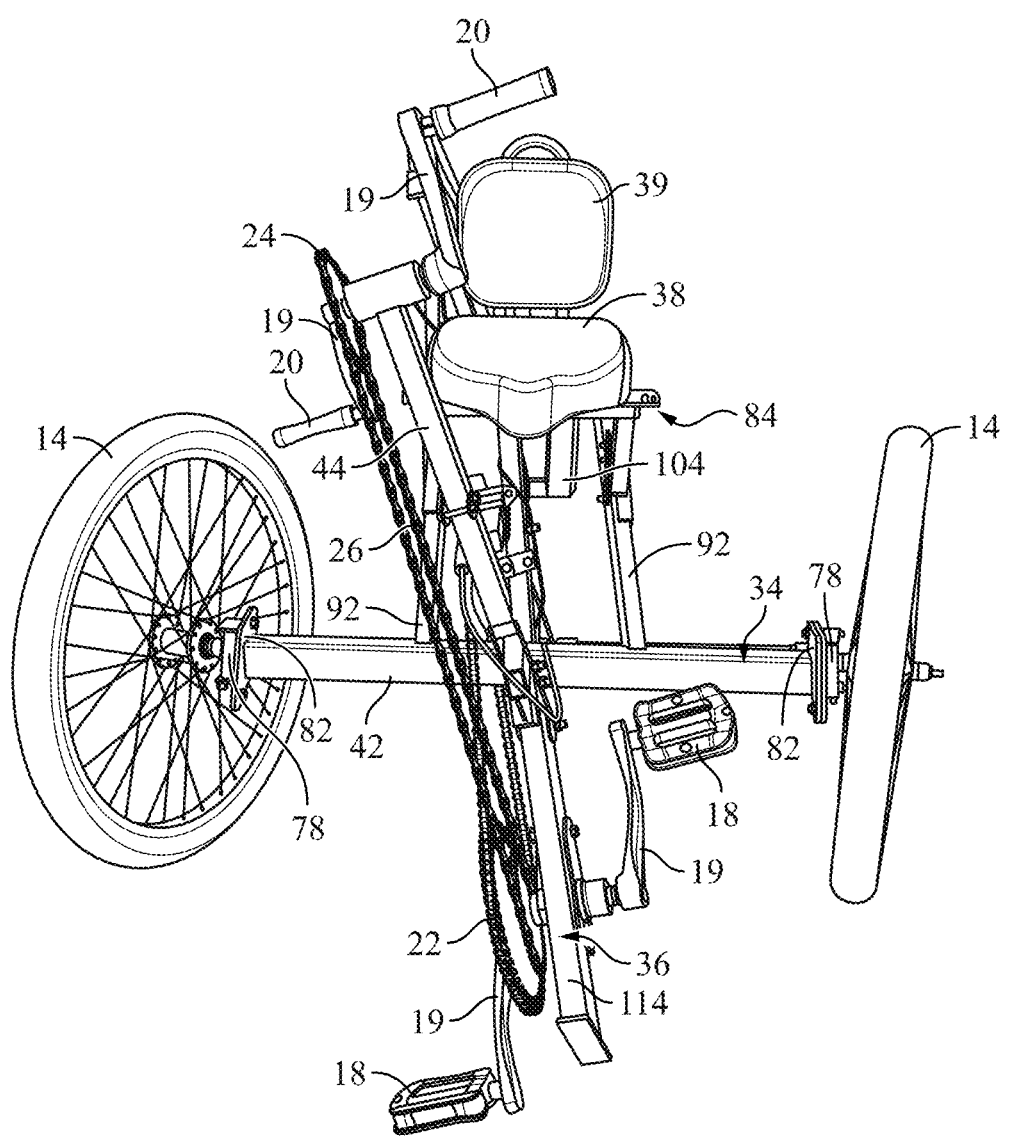
FIG. 13 is a front view of the tricycle in a right turning configuration.

In an exemplary embodiment, as shown in FIG. 8, the inner ends of each of the tie rods 54 is connected to pitman arm 56 with a spherical rod end bearing 64 (also known as a Heim joint) that allows for multiple degrees of freedom in the connection between the tie rods 54 and the pitman arm 56. As shown in FIG. 4, the upstanding rear frame post 66 includes stop 67 that is spaced from the transverse bar 68 in the straight steering configurations of FIGS. 1, 2, 4 and 6-8. Contact between stop 67 of the tilting frame 36 and transverse bar 68 of fixed frame 34 limits the extent to which the tilting frame 36 can tilt left (FIGS. 9-11) and right (FIGS. 12-14). This physical stop 67 prevents overturning of the wheels 14 and overextension of the pivoting linkages 52.

Referring to FIGS. 8, 10 and 12, in an exemplary embodiment, the tie rod bolt 72 that extends through spherical bearings 64 and connects the tie rods 54 to the pitman arm 56 is inclined substantially parallel to the inclined frame member 58. Thus, the pivoting of the rear wheel 16 at its contact patch 74 with the ground surface occurs smoothly because the pivot axis for bolt 72 is aligned with the tilting axis of the rear wheel 16.

As shown in FIG. 1, the exemplary quadrupedal tricycle 100 has a recumbent configuration, wherein a user 102 is seated on a seat 38 having a back rest 39, and the user's legs extend substantially forward rather than downward to the foot pedals 18. Many users find this position more stable and comfortable than the more upright posture of a conventional bicycle, which may lead to a hunched over position that places stresses and strains on the back, arms and wrists. The lower seat position may also lessen the severity of injuries in the event of a fall.

In an exemplary embodiment, a position of seat 38 and back rest 39 are both adjustable to accommodate riders 102 of different stature. As show on FIG. 11, in an exemplary embodiment, seat 38 is mounted on a riser 84 comprising a horizontal bar 86 connecting two upright supports 88, which are in turn welded to sliders 90 that are configured to slide forward and backward along longitudinal members 92 of fixed frame 34. In an exemplary embodiment, knobs 94 can be turned to loosen a frictional engagement with the longitudinal members 92, so that the riser 84 can be slid to a desired fore or aft position on the fixed frame 34. Once the seat 38 is in the desired position, the knobs 94 are tightened to maintain the location of seat 38 on fixed frame 34.

Moreover, a height of back rest 39 can be adjusted up and down on vertical bars 96 of the back rest support by loosening knob 98, raising or lowering the back rest 39 on bars 96, and then turning knob 98 to tighten it and retain the desired vertical position of back rest. Thus, the tricycle 100 can be adjusted to fit a wide variety of users of different sizes. The disclosed tricycle 100 can also be adapted for use with an electric motor to assist a user when fatigued or going up hills, for example.

In an exemplary embodiment, the quadrupedal tricycle 100 is sized to easily travel on bike paths and fit into a minivan, van, or truck. In an exemplary embodiment, each of the wheels has a 24 inch diameter; the tricycle is about 36 inches wide (front wheels, center-to-center) and has a total length of about 79 inches.

As shown in FIG. 4, two hinges 60 connect fixed frame 34 and tilting frame 36. The front hinge 60 is at a front portion of inclined frame member 58 and axle 42, and the rear hinge 60 is at a rear end of inclined frame member 58 of tilting frame 36 and rear bracket 104 of fixed frame 34. Rear bracket 104 is attached to the transverse bar 68. In an exemplary embodiment, rear bracket 104 extends downward on the left side of inclined frame member 58 but there is no corresponding structure on the right side of the inclined frame member 58. This configuration therefore allows for clear movement of lower chain 28 on the right side of the tricycle 100, as shown in FIG. 2 for example.

In an exemplary embodiment, accessory attachment plates 106 can be provided at various locations on tricycle 100, such as on either side of seat 38 at horizontal bar 86 or the top of rear frame post 66, for example. Such plates 106 can include one or more apertures 108 for the insertion of fasteners or accessories such as a flag pole, cupholder, rearview mirror, horn, or bell, for example.

An exemplary, non-limiting embodiment of an apparatus 100 comprises first and second foot pedals 18 attached to a first sprocket 22; first and second hand grips 20 attached to a second sprocket 24; a first chain 26 connecting the first 22 and second 24 sprockets; and a second chain 28 connecting the first sprocket 22 to a third sprocket 30. In an exemplary embodiment, the apparatus 100 comprises a fixed frame 34 and a tilting frame 36. In an exemplary embodiment, the first 22, second 24 and third 30 sprockets are disposed on the tilting frame 36.

In an exemplary embodiment, the fixed frame 34 comprises a seat 38. In an exemplary embodiment, the fixed frame 34 comprises a transverse bar 68 disposed rearward of the seat 38. In an exemplary embodiment, the tilting frame 36 comprises a stop 67 that is configured to contact the transverse bar 68 to limit a left turn extent and to limit a right turn extent.

In an exemplary embodiment, the first and second hand grips 20 are attached to a hand crank stem 44. In an exemplary embodiment, a rear wheel 16 rotates with the third sprocket 30. In an exemplary embodiment, the tilting frame 36 comprises an inclined frame member 58 that is aligned along a line extending between a base of the hand crank stem 44 and a contact patch 74 of the rear wheel 16 with a ground surface 110. In an exemplary embodiment, a pitman arm 56 extends at a right angle from the inclined frame member 58. In an exemplary embodiment, a first tie rod 54 is connected to the pitman arm 56. In an exemplary embodiment, a spherical bearing 64 connects the first tie rod 54 to the pitman arm 56. In an exemplary embodiment, the apparatus 100 comprises a second tie rod 54 and left and right pivot linkages 52 having first ends that are pivotally connected to outer ends of the first and second tie rods 54, respectively. In an exemplary embodiment, the fixed frame 34 comprises an axle 42. In an exemplary embodiment, a distance between the first ends of the left and right pivot linkages 52 is less than a distance between the second ends of the left and right pivot linkages 52.

In an exemplary embodiment, second ends of the left and right pivot linkages 52 are connected to first and second spindles 78. In an exemplary embodiment, a rotation axis 80 of at least one of the first and second spindles 78 is not vertical relative to a ground surface 110 under the apparatus 100. In an exemplary embodiment, each of the first and second spindles 78 rotates with a front wheel 14.

In an exemplary embodiment, the third sprocket 30 comprises a plurality of chain rings. In an exemplary embodiment, a derailleur 32 is configured to move the second chain 28 among the plurality of chain rings. In an exemplary embodiment, the tilting frame 34 comprises a brake lever 46 operably connected to a brake operative with the rear wheel 16.

Although the subject of this disclosure has been described with reference to several embodiments, workers skilled in the art will recognize that changes may be made in form and detail without departing from the scope of the disclosure. In addition, any feature disclosed with respect to one embodiment may be included in another embodiment, and vice-versa.

The invention claimed is:

1. An apparatus comprising:
first and second foot pedals attached to a first sprocket;
first and second hand grips attached to a second sprocket;
a first chain connecting the first and second sprockets;
a second chain connecting the first sprocket to a third sprocket; and
a fixed frame and a tilting frame, wherein the first, second and third sprockets are disposed on the tilting frame.

2. The apparatus of claim 1, wherein the fixed frame comprises a seat.

3. The apparatus of claim 2, wherein the fixed frame comprises a transverse bar disposed rearward of the seat.

4. The apparatus of claim 2, comprising a riser disposed under the seat that is adjustable forward and backward on the fixed frame.

5. The apparatus of claim 1, wherein the first and second hand grips are attached to a hand crank stem of the tilting frame.

6. The apparatus of claim 1, comprising a rear wheel that rotates with the third sprocket.

7. The apparatus of claim 1, wherein the third sprocket comprises a plurality of chain rings.

8. The apparatus of claim 7 comprising a derailleur configured to move the second chain among the plurality of chain rings.

9. An apparatus comprising:
first and second foot pedals attached to a first sprocket;
first and second hand grips attached to a second sprocket;
a first chain connecting the first and second sprockets;
a second chain connecting the first sprocket to a third sprocket;
a fixed frame comprising a transverse bar; and
a tilting frame, wherein the tilting frame comprises a stop that is configured to contact the transverse bar to limit a left turn extent and to limit a right turn extent.

10. An apparatus comprising:
first and second foot pedals attached to a first sprocket;
first and second hand grips attached to a second sprocket;
a first chain connecting the first and second sprockets;
a second chain connecting the first sprocket to a third sprocket; and
a fixed frame and a tilting frame
wherein the first and second hand grips are attached to a hand crank stem of the tilting frame; and
wherein the tilting frame comprises an inclined frame member that is aligned along a line extending between a base of the hand crank stem and a contact patch of a rear wheel with a ground surface.

11. The apparatus of claim 10 comprising a pitman arm that extends at a right angle from the inclined frame member.

12. The apparatus of claim 11 comprising a first tie rod connected to the pitman arm.

13. The apparatus of claim 12 comprising a spherical bearing that connects the first tie rod to the pitman arm.

14. The apparatus of claim 12 comprising:
a second tie rod; and
left and right pivot linkages having first ends that are pivotally connected to outer ends of the first and second tie rods, respectively.

15. The apparatus of claim 14, wherein a distance between the first ends of the left and right pivot linkages is less than a distance between second ends of the left and right pivot linkages.

16. The apparatus of claim 14, comprising first and second spindles to which second ends of the left and right pivot linkages are connected.

17. The apparatus of claim 16, wherein a rotation axis of at least one of the first and second spindles is not vertical relative to a ground surface under the apparatus.

18. The apparatus of claim 16, wherein each of the first and second spindles rotates with a front wheel.

19. The apparatus of claim 10 comprising a hinge and a hinge pin that pivotally attach the inclined frame member to a fixed frame.

* * * * *